United States Patent [19]

Nesheiwat

[11] Patent Number: 5,003,042

[45] Date of Patent: Mar. 26, 1991

[54] PREPARATION OF POLY(ARYLENE SULFIDE KETONE) AND POLY(ARYLENE SULFIDE DIKETONE) RESINS HAVING IMPROVED FILTERABILITY

[75] Inventor: Afif M. Nesheiwat, Madison, N.J.

[73] Assignee: Phillips Petroleum Company, Bartlesville, Okla.

[21] Appl. No.: 458,922

[22] Filed: Dec. 29, 1989

[51] Int. Cl.$^5$ .................. C08G 75/16; C08G 16/00
[52] U.S. Cl. .................... 528/503; 528/226; 528/388; 528/499
[58] Field of Search ............. 528/503, 226, 499, 388

[56] References Cited

U.S. PATENT DOCUMENTS

| | | | |
|---|---|---|---|
| 4,232,142 | 11/1980 | Barr et al. | 528/125 |
| 4,361,693 | 11/1982 | Jansons | 528/86 |
| 4,415,729 | 11/1983 | Scoggins et al. | 528/388 |
| 4,730,034 | 3/1988 | Nesheiwat et al. | 528/388 |
| 4,748,231 | 5/1988 | Nesheiwat | 528/486 |
| 4,892,929 | 1/1990 | Geibel et al. | 528/503 |

FOREIGN PATENT DOCUMENTS 0156131 10/1985 European Pat. Off. .

*Primary Examiner*—Harold D. Anderson
*Attorney, Agent, or Firm*—Richmond, Phillips, Hitchcock & Umphlett

[57] ABSTRACT

A process is provided for preparing a polymeric resin comprising the steps of: (a) preparing a first slurry, wherein the solid component thereof comprises a first particulate resin selected from the group consisting of poly(arlene sulfide ketone)s and poly(arylene sulfide diketone)s, and wherein the liquid component thereof comprises a polar organic compound; (b) substantially liquifying the first particulate resin to form a mixture comprising the substantially liquified first particulate resin and the polar organic compound; and (c) reducing the temperature of the mixture sufficiently to solidify the substantailly liquified resin and form a second slurry, wherein the solid component thereof comprises a second polymeric resin. The filterability of the slurry containing the second polymeric resin is superior to that of the first slurry.

21 Claims, No Drawings

PREPARATION OF POLY(ARYLENE SULFIDE KETONE) AND POLY(ARYLENE SULFIDE DIKETONE) RESINS HAVING IMPROVED FILTERABILITY

FIELD OF THE INVENTION

This invention relates to processes for the production and recovery of poly(arylene sulfide ketone)s or poly(arylene sulfide) diketone)s.

BACKGROUND OF THE INVENTION

Poly(arylene sulfide ketone), henceforth abbreviated as PASK, and poly(arylene sulfide diketone), henceforth abbreviated as PASDK, resins are engineering thermoplastics of potential commercial interest for film, fiber, molding, and/or composite applications because of their outstanding thermal and mechanical properties. General processes for the production of PASK and PASDK are known in the art. For example, PASK and PASDK can be prepared by the reaction of an alkali metal sulfide in a polar organic compound with a polyhaloaromatic ketone or a polyhaloaromatic diketone, respectively.

Disadvantages often associated with the production of PASK and PASDK resins pertain to the handling of the polymer produced. At the completion of a typical polymerization reaction, the reaction mixture is generally in the form of a slurry comprising a liquid phase (predominantly a polar organic compound and water) and a solid phase (predominantly polymeric resin), wherein the polymeric resin is in the form of powder-like particles when recovered. These recovered powder-like particles have very low bulk densities (e.g. generally less than 10 lbs/ft$^3$ when dried). The slurry containing this extremely fine powder-like resin filters very slowly and thus hampers the polymer's washabiliiy, recoverability and processability. Washing, recovering and/or processing PASK and PASDK resins which have low bulk densities is extremely difficult.

One possible solution for improving the handling procedures of PASK and/or PASDK resins would be to employ a process which increases the resins' bulk density. While such a technique would be advantageous to the commercial industry, there are, however, some applications where such a technique would not be the most preferred mode for improving handling procedures. Specifically, in some commercial applications, it is necessary to have the PASK or PASDK resin in the form of a fine powder.

If a technique were employed which improved handling procedures by increasing the bulk density of the PASK or PASDK resins, and if these resins were to be employed in a process requiring the polymer to be in the form of a powder, the resulting resin would have to be milled or ground. Therefore, for those applications where it is desirable to use PASK or PASDK resins while in a powder form, it would be advantageous to improve the handling of the respective resins while not increasing their bulk densities.

Accordingly, one object of this invention to provide a method for preparing low bulk density polymers having associated therewith improved handling procedures.

STATEMENT OF THE INVENTION

In accordance with this invention, novel PASK or PASDK resins are provided by a process comprising the steps of: (a) preparing in an enclosed vessel a first slurry wherein the solid component thereof comprises a first particulate resin selected from the group consisting of PASK and PASDK, and wherein the liquid component :hereof comprises a polar organic compound; (b) substantially liquifying the first particulate resin contained in the first slurry to form a mixture which comprises the substantially liquified resin and the polar organic compound; and (c) reducing the temperature of the mixture sufficiently to solidify the substantially liquified resin contained therein and form a second slurry, wherein the solid component thereof comprises a second particulate resin (i.e., thus liquified and solidified first particulate resin). The filterability of the slurry containing the second particulate resin is significantly improved over that of the first slurry.

DETAILED DESCRIPTION OF THE INVENTION

As used herein, the term "bulk density" refers to the density of a dried granular polymeric resin. A resin's bulk density is determined herein by completely filling a container, having a known weight and volume, to its brim with a dried sample of the polymer to be tested. The bulk density of the specific polymer is then calculated after measuring the weight of the polymer in pounds (lbs) as a function of the volume of the container in cubic feet (ft$^3$). The bulk density of polymeric particles formed in typical PASK and PASDK polymerization processes is often less than about 10 lbs/ft$^3$.

Bulk density of dried granular polymeric resins can be determined in terms of "loose" bulk density and/or "compacted" bulk density. The loose bulk density of a dried granular polymeric resin is determined by measuring the weight of the polymer as it naturally fills the test container to its brim. On the other hand, the compacted bulk density of a dried granular polymeric resin is determined by physically compacting the polymer in the test container, until the compacted polymer reaches the brim thereof, prior to weighing the amount of polymer contained therein. When the term "bulk density" is used herein, it refers to the resin's loose bulk density.

The polymers which are treated by the process of this invention are those having the repeating unit:

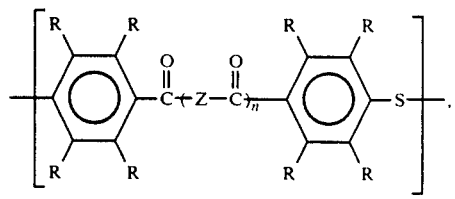

where n=0 or 1, Z=divalent radical selected from

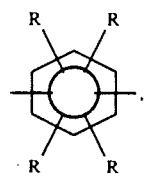

-continued

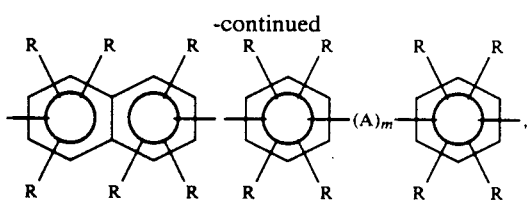

where m=0 or 1, A is selected from O, S,

$SO_2$, $CR_2$, and R is hydrogen or an alkyl radical having 1-4 carbon atoms.

Although other polymeric resins are not excluded, in general, the presently preferred PASK resins produced and/or recovered by the inventive process disclosed herein are poly(phenylene sulfide ketone) (PPSK) resins having as the repeating unit:

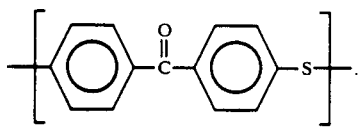

In general, the preferred PASDK resins produced and/or recovered by the inventive process herein are poly(phenylene sulfide diketone) (PPSDK) resins having as the repeating unit:

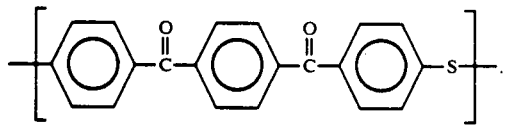

This invention provides processes for improving the filterability of a slurry containing a PASK or PASDK resin without materially increasing the bulk density of the resin.

Since this invention can be practiced at any time after a first particulate PASK or PASDK resin is polymerized, it can be viewed as either (1) an effective means for improving the filterability of PASK or PASDK resin slurries, or (2) a means for providing slurries of novel low bulk density PASK or PASDK resins which have associated therewith improved filterability.

When practicing this invention, a first slurry is prepared in an enclosed vessel, wherein the solid component thereof comprises a first particulate resin selected from the group consisting of PASK and PASDK, and wherein the liquid component thereof comprises a polar organic compound. Any suitable method can be employed to prepare the first slurry of this invention. An example of a suitable method which will produce such a first slurry is one wherein a polyhalo-substituted aromatic ketone (or diketone) is contacted under suitable polymerization conditions with reactants comprising: (a) a sulfur source, (b) a polar organic compound, and (c) water. Under these conditions, a first slurry results wherein the solid component thereof comprises a first particulate PASK or PASDK resin having a bulk density generally less than about 10 lbs/ft$^3$ (when recovered and dried), and wherein the liquid component thereof comprises a mixture of the polar organic compound and water.

Another example of a suitable method which results in such a first slurry comprises taking a PASK or PASDK resin which has already been prepared, recovered, and, optionally, dried and adding this resin to a liquid mixture comprising a polar organic compound.

Polar organic compounds which can be employed when practicing this invention are those which remain substantially in a liquid phase at the temperatures and pressures used for substantially liquifying the first particulate resin and which can also function as at least a partial solvent for the first particulate resin. Generally, organic amides are employed as the polar organic compound. Suitable organic amides can be cyclic or acyclic and can have from about 1 to about 10 carbon atoms per molecule. Examples of suitable organic amides include, but are not limited to, formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone (NMP), N,N'-ethylenedi-2-pyrrolidone, hexamethylphosphoramide, tetramethylurea, 1,3-dimethyl-2-imidazolidinone and mixtures thereof. NMP is the presently preferred organic amide.

In the first slurry, the molar ratio of the moles of polar organic compound per moles of divalent sulfur present in the first particulate resin is generally determined by mechanical and/or economic limitations. When the first slurry results from a polymerization reaction, the molar ratio of the moles of organic compound to the moles of divalent sulfur employed as a reactant generally ranges from about 3:1 to about 25:1, preferably, from about 6:1 to about 20:1; and even more preferably, from about 8:1 to about 16:1.

The substantial liquification of the first particulate PASK or PASDK resin contained in the first slurry can be accomplished by using any suitable liquification process known by those skilled in the art. One example of such a suitable liquification process is heating the slurry to a temperature at which the first particulate resin liquifies. Since the liquid component of the slurry containing the resin comprises a polar organic compound (which can also function as at least a partial solvent for the resin), the elevated temperature of the aforementioned resin liquification step will generally not exceed the melting point of the first particulate resin. For example, if the solid component of the first slurry comprises, as the first particulate resin, poly(phenylene sulfide keione) (PPSK), and the liquid component of the same slurry consists essentially of the polar organic compound which can also function as a solvent, NMP, in order to substantially liquify this specific resin, this slurry need only be heated to a temperature of at least about a 280° C. (536° F.), instead of to the melt temperature of PPSK (about 340° C.).

Another example of a suitable liquification process is the addition of a suitable compound which can function as a solvent of the particulate resin. Depending upon the type and/or amount of this compound being subsequently added to the first slurry, it may still be necessary to elevate the temperature thereof in order to substantially liquify the particulate resin contained therein. Moreover, if other components are present in the first slurry, the temperature needed to substantially liquify a PASK resin contained therein generally increases. Since in a typical PASK or PASDK polymerization reaction the liquid component of the first slurry does not consist solely of a polar organic compound (e.g., water is also present), in order to substantially liquify PASK or PASDK resins, after a completed polymerization reaction, the first slurry must be heated. For example, if the solid component of the first slurry comprises, as the first particulate resin, PPSK, and the liquid component of the same slurry consists essentially of NMP and a small amount of water (e.g., approximately 10% by weight of liquid component), in order to substantially liquify this specific particulate resin, this slurry must be heated to a temperature of at least about 300° C. (572° F.).

PASK and PASDK polymerization reactions generally employ a polymerization reaction temperature ranging from about 232° C. (450° F.) to about 288° C. (550° F.). At the termination of typical PASK or PASDK polymerization reactions, a heated first slurry is generally formed in the enclosed reaction vessel. This heated first slurry comprises a particulate PASK or PASDK resin as the solid component and a mixture consisting predominantly of a polar organic compound and water as the liquid component. At the termination of the polymerization reaction, the pressure in the enclosed reaction vessel will generally range from about 150 psig to about 500 psig.

As stated above, the PASK and PASDK polymerization reactions often result in a heated first slurry wherein, due to the polymerization recipe, an initial amount of water is present. Generally, during a typical polymerization process for the preparation of PASK or PASDK, wherein the sulfur source is provided by employing a mixture of a base (e.g., NaOH) and sodium hydrosulfide, approximately 1 mole of water is produced for each mole of divalent sulfur present in the repeating units of the respective resins.

If it is desired, vapors can be vented from the enclosed reaction vessel containing the heated first slurry resulting from a terminated polymerization reaction, such that at least a portion of the water is removed therefrom prior to the substantial liquification of the resin. Employment of a venting step prior to the substantial liquification of the resin prevents the pressure from exceeding the pressure produced during the polymerization reaction. In order to practice this technique, the temperature of the first slurry must be above about 100° C. (212° F.), preferably above about 200° C. (392° F.). For purposes of this invention, "terminated polymerization reaction" means that the polymerization has been effectively terminated. The term is not meant to imply that the reaction is necessarily complete, nor that 100% conversion of monomer to polymer has occurred.

In order to keep the bulk density of the resulting second particulate PASK or PASDK resins below about 10 lbs/ft$^3$, the amount of water present in the mixture immediately prior to solidification of the substantially liquified resin, should not achieve that amount which will result in increasing the resins' bulk density above about 10 lbs/ft$^3$. It is preferred that the amount of water present in the mixture should not exceed a molar ratio of about 1 mole water per mole of polar organic compound when the polar organic compound is NMP.

After the first particulate resin has been substantially liquified, the temperature of the resulting mixture comprising the substantially liquified resin and a polar organic compound and water is lowered to a temperature which is at or below the specific resin's liquid-to-solid phase transitional temperature. This temperature reduction results in the formation of a second slurry, wherein the solid component thereof comprises a novel second particulate resin (i.e., the thus substantially liquified and solidified first particulate resin). Thereafter, if desired, the novel second particulate resin can be recovered from the second slurry using conventional separation techniques.

The phrase "liquid-to-solid phase transitional temperature", as used herein, refers to the temperature at which the liquid mixture comprising a substantially liquified resin and a polar organic compound must be lowered in order for the substantially liquified resin contained therein to solidify.

While the liquid-to-solid phase transitional temperature differs with the type of resin produced, it can be readily determined by one skilled in the art. For example, by using a high pressure, flat glass gauge that can be heated, such as that available from the Jerguson Gauge & Valve Co., it can be seen that PPSK, when in the presence of the polar organic compound, NMP, has a liquid-to-solid phase transitional temperature of about 245° C. (473° F.). Therefore, in order to solidify a substantially liquified PPSK resin under these conditions, the temperature of the liquid mixture must be lowered to at least 245° C. (473° F.).

On the other hand, PASDK resins have liquid-to-solid phase transitional temperatures which are generally greater than those observed for PASK resins. For example, PPSDK, when in the presence of the polar organic compound NMP, has a liquid-to-solid phase transitional temperature of about 302° C. (575° F.). Therefore, in order to solidify a substantially liquified PPSDK under these conditions, the temperature of the liquid mixture must be lowered to at least 302° C. (575° F.).

The reduction in temperature is preferably performed at a relatively slow rate. This can be achieved, for example, by removing any reactor heating means and allowing the reactor to cool without applying any cooling means. Typically, this procedure will result in a cooling rate of about 1° C./min.

The thermal stability of the resulting second particulate resin can be improved if desired by subjecting the second particulate resin to a caustic treating process. This subsequent washing process is conducted at an elevated temperature with a suitable base such as an alkali metal carbonate or an alkali metal hydroxide.

Another means of further improving the thermal stability of the resulting second particulate resin is by treating the second particulate resin at an elevated temperature with water-soluble calcium cations.

The process of subsequently treating the resulting second particulate resin with either a base or the calcium cations or both can be carried out with conventional equipment. A convenient method for carrying out a subsequent treating procedure is to first recover the second particulate resin from the second slurry. The recovered second particulate resin is then contacted with the base and/or the calcium cations, in any sequence, in a vessel having provided therein a means of agitation. The contacting can be carried out in a single vessel or with a plurality of vessels. cl EXAMPLES The example which follows is intended to assist in a further understanding of this invention. Particular materials employed, species, and conditions are intended to illustrate the invention and are not meant to limit the reasonable scope thereof.

EXAMPLE I

This example demonstrates a process for preparing a second particulate PASK resin, from a first particulate PASK resin, by the process of this invention. The specific first particulate PASK resin used in this Example is poly(phenylene sulfide ketone), henceforth, PPSK.

The first particulate PPSK resin used in this example was prepared by reacting, in a stirred 2-gallon reaction vessel, the following reactants which were previously deoxygenated in three pressurize-release cycles using nitrogen: 502 grams (2.0 moles) of the monomer 4,4'-dichlorobenzophenone (4,4'-DCBP), 192 grams of a 58.3 weight-% aqueous sodium hydrosulfide (NaHS) solution (i.e., 112 grams (2.0 moles) NaHS and 80 grams (4.4 moles) water), 80 grams (2.0 moles) of sodium hydroxide (NaOH), 2400 ml (24.86 moles) of N-methyl-2-pyrrolidone (NMP), and 108 ml (6.0 moles) of water, at 250° C. for 3.5 hours.

During the 3.5 hour reaction period, a first slurry was produced wherein the solid component was predominantly a first particulate PPSK and the liquid component was predominantly NMP and water. Since during polymerization, approximately one mole of water is produced for each mole of divalent sulfur charged into the reactor, in addition to the water initially charged into the reactor prior to polymerization, the first slurry also included an additional 2 moles of water.

The first particulate PPSK contained in the first slurry was then substantially liquified by heating the first slurry to a temperature of 305° C. Then the contents of the reactor were allowed to cool at a rate of approximately 1° C./minute while being agitated at a mixing speed of approximately 250 rpm in order to form a second slurry comprising solid PPSK and NMP and water. The internal temperature of the reactor continued to cool until the temperature of its contents reached approximately 25° C. (77° F.).

After the second slurry had cooled to room temperature, 3.78 liters of deionized water were charged into the reactor while stirring the contents therein. The polymeric slurry was then filtered using a 5000 ml funnel filter and Whatman #1 (24 cm) filter paper. An aspirator was used as the vacuum source. The filtering process was accomplished in approximately 5 minutes, therefore achieving a rate of approximately 1.3 liters per minute. The particulate PPSK resin recovered from this operation will be referred to as Resin 1. Visual and quantitative observations for Resin 1 are recorded in Table I.

To further demonstrate the effectiveness of the present invention, another PPSK resin (Resin 2) was prepared. Resin 2 was prepared and recovered in accordance with the same procedure set out for Resin 1 except that: (a) following the 3.5 hour reaction period, the reactor was heated to a temperature of 330° C. (626° F.), and (b) after the reactor cooled to room temperature, 7.55 liters of water were charged therein. The resulting second slurry which contained Resin 2 was filtered as described above in approximately 3 minutes, thus achieving a rate of approximately 3.4 liters per minute.

A comparative PPSK resin (Resin 3) was prepared by reacting, in a stirred 1-gallon reaction vessel, the following deoxygenated reactants: 251 grams (1.0) mole of the monomer 4,4'-dichlorobenzophenone (p-DCBP), 95 grams of a 58.3 weight-% aqueous sodium hydrosulfide (NaHS) solution (i.e., 56 grams (1.0 mole) NaHS and 39 grams (2.2 moles) water), 40 grams (1.0 mole) sodium hydroxide (NaOH), 1200 ml (12.43 moles) of N-methyl-2-pyrrolidone (NMP), and 54 ml (3.0 moles) of water, at 250° C. for 3 hours.

During the 3 hour reaction period, a first slurry was produced, wherein the solid component was predominantly a first particulate PPSK and the liquid component was predominantly NMP and water. Since during polymerization, approximately one mole of water is produced for each mole of divalent sulfur charged into the reactor, in addition to the water initially charged into the reactor prior to polymerization, the first slurry also included an additional 1 mole of water.

Following the 3 hour reaction period, heating was terminated and the reactor was allowed to cool to room temperature at a rate of approximately 1° C./minute. Note that the temperature of the reactor contents was never greater than approximately 250° C. Approximately 1.5 liters of water were then charged to the cooled reactor while stirring. Resin 3 was recovered from the first slurry in accordance with the same filtering techniques set out for the recovery of Resins 1 and 2. The slurry containing comparative Resin 3 was filtered in approximately 25 minutes, achieving a rate of approximately 0.1 liters per minute. Visual and quantitative observations for Resins 1, 2 and 3 are recorded in TABLE I.

TABLE I

Effects of Recovery Method on Filtration Rate

| Resin No. | Type of Particles Produced | Amount of Liquid Filtered[a] (liters) | Filtration Time (min) | Filtration Rate (liter/min) |
|---|---|---|---|---|
| 1 (Inv.) | powder[b] | 6.40 | 5 | 1.3 |
| 2 (Inv.) | powder | 10.17 | 3 | 3.4 |
| 3 (Comparative) | powder | 2.81 | 25 | 0.1 |

[a] Amount of Liquid is the volumetric sum of (1) NMP charged into the reactor, (2) water charged into the reactor prior to polymerization (3) water produced in reactor during polymerization, and (4) water charged to reactor after reprecipitation less (5) liquid condensed from vapors vented.
[b] The bulk density of a "powder", as used herein is generally less than about 10 lbs/ft³.

The date of Table I demonstrate that while the physical form of the PPSK resins recovered by either the inventive process or conventional processes is the same, Resins 1 and 2, recovered using the invention process, exhibit a greatly enhanced filtration rate. This enhanced filtration rate greatly improves the handling of the PPSK resin.

It is evident from the foregoing that various modifications can be made to the embodiments of this invention without departing from the scope and spirit thereof, which will be apparent to those skilled in the art. Having thus described the invention, it is claimed as follows:

That which is claimed is:

1. A process for preparing a particulate polymeric resin, having associated therewith improved filterability comprising the steps of:

(a) preparing in an enclosed vessel a first slurry, wherein the solid component of said first slurry comprises a first particulate polymeric resin selected from the group consisting of poly(arylene sulfide ketone)s and poly(arylene sulfide diketone)s, and wherein the liquid component of said first slurry comprises a polar organic compound;

(b) substantially liquifying said first particulate resin to form a mixture comprising said substantially liquified resin and said polar organic compound; and (c) reducing the temperature of said mixture sufficiently to solidify said substantially liquified resin and form a second slurry, wherein the solid component of said second slurry comprises a second particulate resin, and wherein the filterability of said second slurry containing said second particulate resin is superior to the filterability of said first slurry.

2. A process in accordance with claim 1 wherein said first particulate resin comprises a poly(arylene sulfide ketone).

3. A process in accordance with claim 2 wherein said substantial liquification of said first particulate resin is accomplished by heating said first slurry to a temperature of at least about 300° C.

4. A process in accordance with claim 3 wherein said substantial liquification of said first particulate resin is accomplished by heating said first slurry to a temperature in the range from about 300° C. to about 325° C.

5. A process in accordance with claim 2 wherein said first slurry is prepared by reacting a polyhaloaromatic ketone, an alkali metal sulfide, water and a polar organic compound under polymerization conditions.

6. A process in accordance with claim 5 wherein said polyhaloaromatic ketone is a dihalobenzophenone; said alkali metal sulfide is sodium sulfide; and said polar organic compound is N-methyl-2-pyrrolidone.

7. A process in accordance with claim 6 wherein said dihaloaromatic ketone is 4,4'-dichlorobenzophenone.

8. A process in accordance with claim 2 wherein said poly(arylene sulfide ketone) is poly(phenylene sulfide ketone).

9. A process in accordance with claim 8 wherein said liquid component of said first slurry consists essentially of a polar organic compound.

10. A process in accordance with claim 9 wherein said substantial liquification of said first particulate resin is accomplished by heating said first slurry to a temperature of at least about 280° C.

11. A process in accordance with claim 1 wherein said first particulate resin comprises a poly(arylene sulfide diketone).

12. A process in accordance with claim 11 wherein said first slurry is prepared by reacting a polyhaloaromatic diketone, an alkali metal sulfide, water and a polar organic compound under polymerization conditions.

13. A process in accordance with claim 10 wherein said polyhaloaromatic ketone is a bis-chlorobenzoyl benzene; said alkali metal sulfide is sodium sulfide; and, said polar organic compound is N-methyl-2-pyrrolidone.

14. A process in accordance with claim 11 wherein said poly(arylene sulfide diketone) is poly(phenylene sulfide diketone).

15. A process in accordance with claim 14 wherein said liquid component of said first slurry consists essentially of a polar organic compound.

16. A process in accordance with claim 1 wherein said liquid component of said first slurry further comprises water, and wherein the molar ratio of the moles of said water present in said first slurry to the moles of said polar organic compound present in said first slurry is less than that which is necessary to result in said second particulate resin having a bulk density greater than about 10 lbs/ft$^3$ when recovered.

17. A process in accordance with claim 16 wherein the molar ratio of the moles of said water present in said mixture to the moles of said polar organic compound in said first slurry is not greater than about 1:1.

18. A particulate polymeric resin, having associated therewith improved filterability, prepared by a process comprising the steps of:
(a) preparing in an enclosed vessel a first slurry, wherein the solid component of said first slurry comprises a first particulate polymeric resin selected from the group consisting of poly(arylene sulfide ketone)s and poly(arylene sulfide diketone)s, and wherein the liquid component of said first slurry comprises a polar organic compound;

(b) substantially liquifying said first particulate resin to form a mixture comprising said substantially liquified resin and said polar organic compound; and (c) reducing the temperature of said mixture sufficiently to solidify said substantially liquified resin and form a second slurry, wherein the solid component of said second slurry comprises a second particulate resin, and wherein the filterability of said second slurry containing said second particulate resin is superior to the filterability of said first slurry.

19. A polymeric resin as in claim 18 wherein said first particulate resin comprises a poly(arylene sulfide ketone).

20. A polymeric resin as in claim 18 wherein said first particulate resin comprises a poly(arylene sulfide diketone).

21. A polymeric resin as in claim 18 wherein said liquid component of said first slurry further comprises water, and wherein the molar ratio of the moles of said water present in said first slurry to the moles of said polar organic compound present in said first slurry is less than that which is necessary to result in said second particulate resin having a bulk density greater than about 10 lbs/ft3 when recovered.

* * * * *